(12) United States Patent
Capek et al.

(10) Patent No.: US 11,357,367 B1
(45) Date of Patent: Jun. 14, 2022

(54) MODIFIED PORTABLE COMMODE CABANA WITH A PRIVATE URINAL CABANA

(71) Applicants: William Capek, Nyack, NY (US); Michele Renee Pearson, Nyack, NY (US)

(72) Inventors: William Capek, Nyack, NY (US); Michele Renee Pearson, Nyack, NY (US)

( * ) Notice: Subject to any disclaimer, the term of this patent is extended or adjusted under 35 U.S.C. 154(b) by 0 days.

(21) Appl. No.: 17/113,660

(22) Filed: Dec. 7, 2020

Related U.S. Application Data

(60) Provisional application No. 62/945,832, filed on Dec. 9, 2019.

(51) Int. Cl.
*A47K 11/02* (2006.01)
*A47K 11/12* (2006.01)

(52) U.S. Cl.
CPC .............. *A47K 11/02* (2013.01); *A47K 11/12* (2013.01)

(58) Field of Classification Search
CPC ........ A47K 11/02; A47K 11/04; A47K 11/12; E04H 1/1216
See application file for complete search history.

(56) References Cited

U.S. PATENT DOCUMENTS

| | | |
|---|---|---|
| D261,975 S | 11/1981 | Sauls |
| 4,922,557 A | 5/1990 | Harding et al. |
| 5,232,232 A | 8/1993 | Kisshi |
| 5,647,074 A | 7/1997 | White et al. |
| 5,970,914 A | 10/1999 | Steil et al. |
| 6,402,338 B1 | 6/2002 | Mitzel et al. |
| 6,418,672 B1 | 7/2002 | Hampel |
| D497,210 S | 10/2004 | Averett et al. |
| 6,823,639 B2 | 11/2004 | Hampel |
| 7,117,646 B2 * | 10/2006 | Blaisdell ................. B63B 17/00 52/79.5 |
| 7,135,035 B1 | 11/2006 | Dimmick |
| 8,079,096 B2 | 12/2011 | Roberts |
| 9,074,382 B2 * | 7/2015 | Cheng ................... E04H 1/1216 |
| 9,309,683 B1 | 4/2016 | Huang |
| 10,458,135 B2 * | 10/2019 | Schimmel ............. E04H 1/1216 |
| 2003/0121093 A1 | 7/2003 | Braxton |
| 2006/0123534 A1 | 6/2006 | Parr |
| 2009/0100585 A1 | 4/2009 | Roberts |
| 2009/0211002 A1 | 8/2009 | Norgaard |

(Continued)

*Primary Examiner* — Janie M Loeppke

(57) ABSTRACT

A sliding partition enclosure system for a modified portable commode cabana with a private urinal cabana, providing simultaneous dual use. A commode cabana's internal compartment includes a commode and waste containment chamber disposed below. An external shell including: a roof, three wall panels, a front panel with latching door and a floor panel with external parallel tracks, a urinal affixed upon the external shell, a drainage system connecting the externally mounted urinal to the enclosed waste containment chamber. A sliding partition unit when extended, provides the private urinal cabana enclosure, including: two horizontally side panels on external parallel tracks of the commode cabana, a front panel with latching door, a roof, and a floor panel hinged to the commode cabana's floor that folds down, stabilizing the sliding partition enclosure when in use. The floor folds up and the partition slides closed when not in use for portability.

3 Claims, 10 Drawing Sheets

(56) References Cited

U.S. PATENT DOCUMENTS

| | | | |
|---|---|---|---|
| 2009/0235445 A1* | 9/2009 | Goldstein | E04H 1/1216 4/462 |
| 2011/0000011 A1 | 1/2011 | Gebka | |
| 2011/0186100 A1 | 8/2011 | Bolin | |
| 2012/0144576 A1 | 6/2012 | Taylor | |

* cited by examiner

MODIFIED PORTABLE COMMODE CABANA WITH A PRIVATE URINAL CABANA

CROSS-REFERENCE TO RELATED APPLICATIONS

This application claims priority benefit to U.S. Provisional Patent Application Ser. No. 62/945,832 filed on Dec. 9, 2019, the entirety of which is incorporated by reference herein.

FIELD OF THE INVENTION

The present invention relates to an outdoor non plumbed restroom facility and more particularly to an improved dual-person modified portable commode cabana system with a sliding partition, for providing a private urinal cabana enclosure to meet public needs more efficiently.

BACKGROUND OF THE INVENTION

Description of Related Art

A broad variety of portable toilet enclosure assemblies have been provided for personal use. The most ordinarily used type of portable toilet enclosures are portable commode cabanas. Portable commode cabanas are free-standing non-plumbed structures commonly used publicly and privately at various outdoor locations where restroom facilities are needed. They are used at small or large outdoor venues such as sporting events, parks, concerts, fairs, markets, and other gatherings of people. Portable commode cabanas are also necessary for private functions such as on construction sites, at parties, or for organizational meetings and other infrequent or temporary events. Typically, portable commode cabanas are constructed out of light weight molded plastic and are temporarily placed, private rectangular-shaped structures. Generally, an interior of the commode cabana enclosure includes an open-front U-shaped standard commode seat with a cover. Waste is gravity fed into an internal waste tank disposed below the commode. Typically, the waste tank is chemically treated with a disinfectant chemical macerater and deodorizer for maximum efficacy. Often portable commode cabana designs have both a standard commode and an optional internal urinal discarding into the shared waste tank.

A frequent problem is when the number of people in need of using these facilities out numbers the available facilities, generating long lines as a result. Moreover, people waiting uncomfortably invariably leads to inappropriate behavior and public urination. On some occasions portable urinal units are provided to meet the overwhelming demands at these outdoor events. These designs offer additional facilities for urination although, require extra expense and setup time. In addition, portable urinal units usually require their own waste tank for proper sanitation practices and additional privacy screens as not to compromise the user's privacy. Another concern of event planners is extra space required for storage and transportation of portable commode cabanas and portable urinal units. Thus, it is preferred to provide a portable commode cabana and an additional portable urinal enclosure that can be retracted and stowed when not in use to a similar footprint of a single traditional portable commode cabana. Therefore, a need exists for a more effective configuration of portable commode cabanas and portable urinal cabanas with structural features to alleviate the problems mentioned above.

BRIEF SUMMARY OF THE INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

In accordance with the present disclosure, portable commode cabanas and their configurations provide for various uses. This disclosure provides an improved dual-person modified portable cabana system with a sliding partition for providing a private urinal cabana enclosure. The system enables said sliding partition to slide along the parallel tracks of the floor panel of the modified portable cabana to guide the private urinal cabana's enclosure from a retracted position to a functional position. Through innovative use and placement of an external urinal and a sliding partition with latching door, the present invention allows two people to use a single unit simultaneously, while maintaining privacy of both users.

The present invention has for its object to provide a modified portable commode cabana enclosure assembly of the type stated in the preamble wherein the commode cabana has a rigid exterior including: a roof panel; a floor panel with parallel tracks hinged externally to a private urinal cabana enclosure's floor panel; a front door panel with a door and a latch; a right side panel with a mechanical stop on a rear exterior edge; a left side panel with a mechanical stop on a rear exterior edge; the right and left side panels extend from left and right sides of the front door panel to a rear panel comprising an externally mounted urinal.

In one embodiment of the invention an improved dual-person modified portable commode cabana system with a sliding partition, for providing a private urinal cabana enclosure, is provided, wherein, the modified portable commode cabana comprises an internal compartment including: a commode; an optional urinal; an enclosed waste containment chamber disposed below the commode for receiving waste; a drainage system connecting the externally mounted urinal to the enclosed waste containment chamber; and the floor panel.

In another embodiment of the invention an improved dual-person modified portable commode cabana system with a sliding partition, for providing a private urinal cabana, wherein the sliding partition of the private urinal cabana includes: a roof panel; a hinged floor panel; a front door panel, with a door and latch; a right-side panel with a mechanical stop on a rear interior edge; a left side panel with a mechanical stop on a rear interior edge; bottoms of the right and left side panels slide on the tracks on said floor panel of the modified portable commode cabana.

In a practical present embodiment of the invention an improved dual-person modified portable commode cabana system with a sliding partition, for providing a private urinal cabana, wherein the system enables said sliding partition to slide along the parallel tracks of the floor panel of the modified portable commode cabana to guide the private urinal cabana enclosure from a retracted position to a functional position; the private urinal cabana's floor panel folds up parallel to the modified portable commode cabana's rear exterior, permitting the sliding partition to slide along the parallel tracks to the retracted position, for transport or storage. The system is deployed to the functional position by sliding the sliding partition along the parallel tracks to the stops and folding down the hinged floor, for stabilizing the partition.

According to some embodiments, an improved dual-person modified portable commode cabana system, wherein the sliding partition is either applied to a back of the modified portable commode cabana enclosure or applied to a left or right side of the modified portable commode cabana enclosure.

According to some embodiments, an improved dual-person modified portable commode cabana system, wherein said modified portable commode cabana's left or right-side panels or rear panel are configured to include a detachable external urinal.

Due to the unique design of the present invention, a singular unit can drastically reduce wait times and can provide privacy to both users.

The above summary was intended to summarize certain embodiments of the present disclosure. Embodiments will be set forth in more detail in the figures and description of embodiments below. It will be apparent, however, that the description of the embodiments is not intended to limit the present invention, the scope of which should be properly determined by the appended claims.

DETAILED DESCRIPTION OF THE INVENTION

Figure 1:
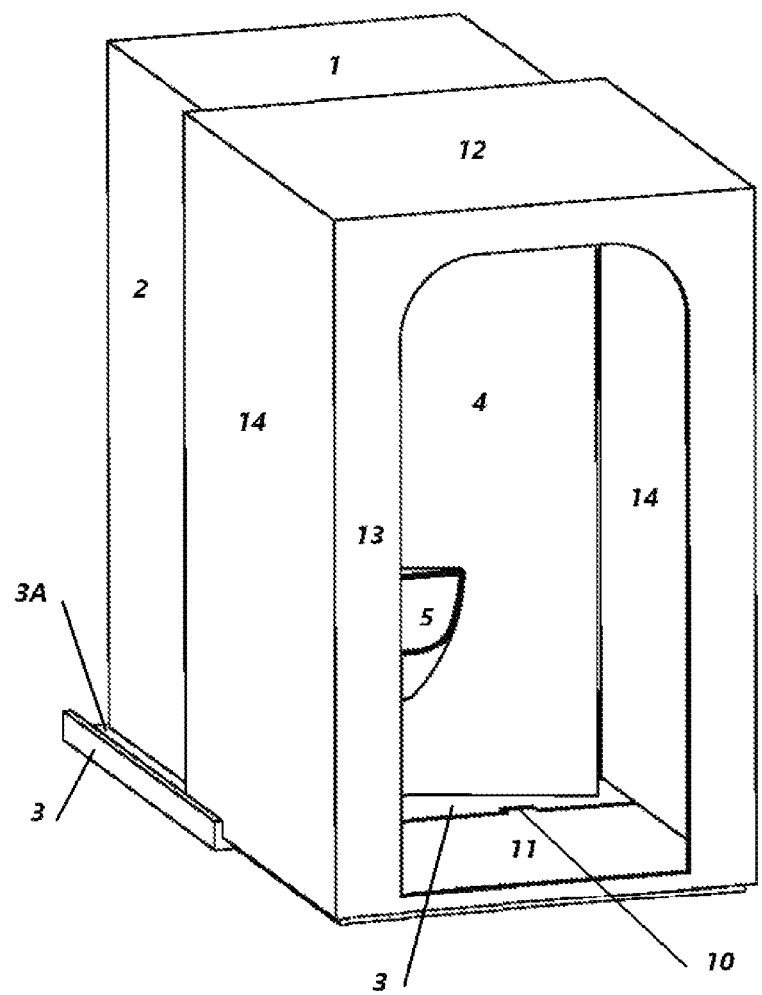
FIG. 1 is a perspective view of the urinal cabana side of the system when deployed, providing a private urinal cabana, according to an embodiment of the present invention, shown herein without a door.

The description that follows is presented to enable one skilled in the art to make and use the present invention and is provided in the context of a particular application and its requirements. Various modifications to the disclosed embodiments will be apparent to those skilled in the art, and the general principles discussed below may be applied to other embodiments and applications without departing from the scope and spirit of the invention. Therefore, the invention is not intended to be limited to the embodiments disclosed, but the invention is to be given the largest possible scope which is consistent with the principles and features described herein.

In the following description, like reference characters designate like or corresponding parts throughout the several views.

The inventors provide a unique improved dual-person modified portable commode cabana system with a sliding partition for providing a private urinal cabana enclosure for simultaneous private use by two persons. The present invention is described in enabling detail in the following examples, which may represent more than one embodiment of the present invention.

FIG. 1 is a perspective view of the urinal cabana side of the system when deployed to the functional position, providing a private urinal cabana, according to an embodiment of the present invention, shown herein without a door (15). The doors used in the system, shown in detail in FIG. 9 and FIG. 10. In the illustrated embodiment of FIG. 1, the system includes: a roof panel of the commode cabana (1); a pair of side wall panels of the commode cabana (2); a floor panel of the commode cabana (3) with tracks (3A) and hinges (10); an exterior side of a rear wall panel of the commode cabana (4); a urinal (5) disposed on said exterior rear wall panel of the commode cabana (4); hinges (10) secure a floor panel of the urinal cabana (11) to said hinged floor panel of the commode cabana (3); a roof panel of the urinal cabana (12); a front wall panel of the urinal cabana (13), shown without a door (15); and a pair of side wall panels of the urinal cabana (14).

Figure 2:
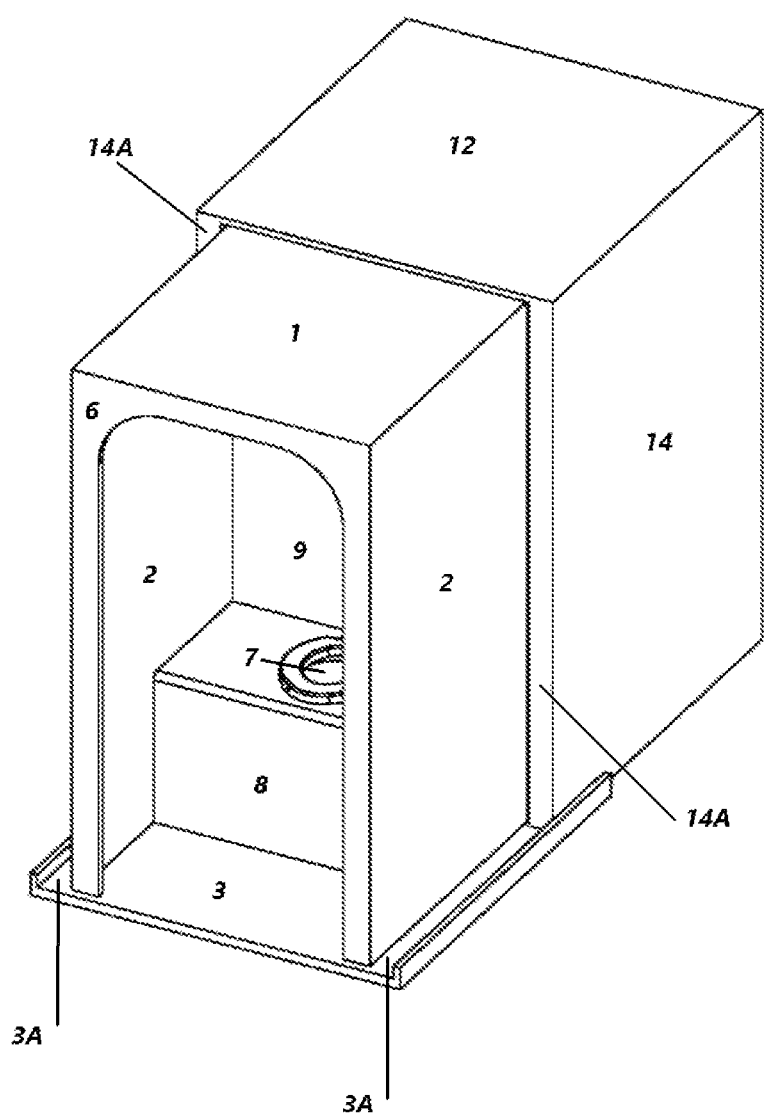
FIG. 2 is a perspective view of the commode cabana side of the system when deployed, providing a private urinal cabana, according to an embodiment of the present invention, shown herein without a door.

FIG. 2 is a perspective view of the commode cabana side of the system when deployed to the functional position, providing a private urinal cabana, according to an embodiment of the present invention, shown herein without a door (15). The doors used in the system, shown in detail in FIG. 9 and FIG. 10. In the illustrated embodiment of FIG. 2, the system includes: a roof panel of the commode cabana (1); a pair of side wall panels of the commode cabana (2); a floor panel of the commode cabana (3) with tracks (3A) and hinges (10); a front wall panel of the commode cabana (6), shown without a door (15); a commode of the commode cabana (7); a waste containment chamber of the commode cabana (8); interior side of a rear wall panel of the commode cabana (9); a roof panel of the urinal cabana (12); a side wall panel of the urinal cabana (14); and a pair of mechanical stops (14A) on a rear interior edge, of said side wall panels of the urinal cabana (14). Said mechanical stops (14A) limit the extension of the urinal cabana's partition.

Figure 3:
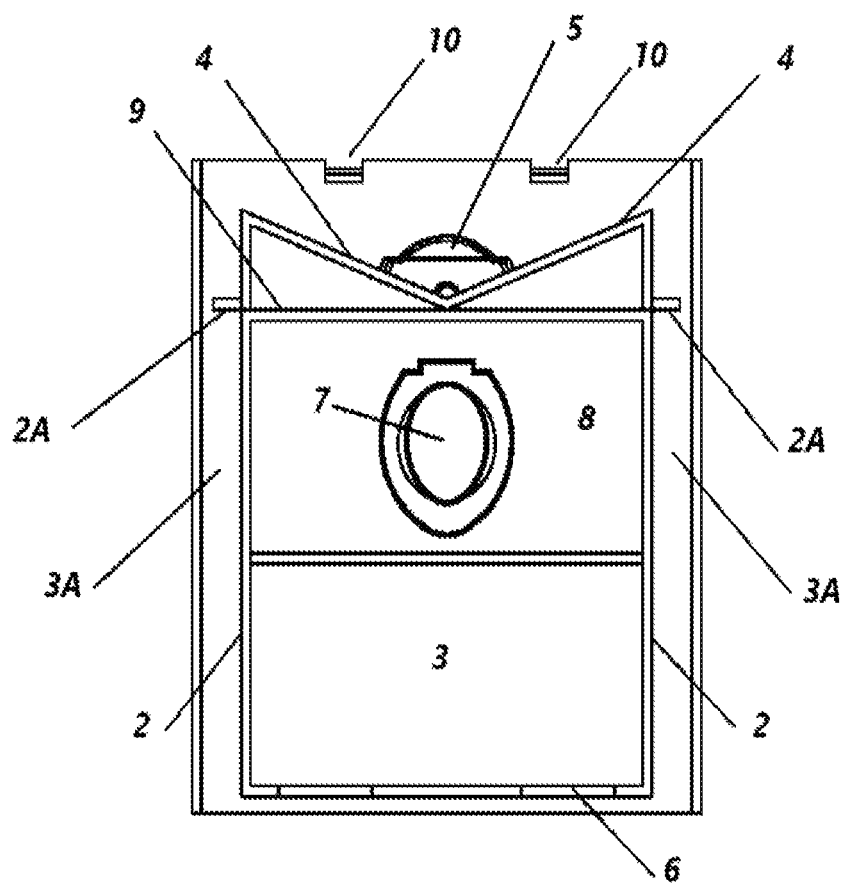
FIG. 3 is a top perspective view of the modified commode cabana, according to an embodiment of the present invention, shown herein without a roof panel.

FIG. 3 is a top perspective view of the modified commode cabana, according to an embodiment of the present invention, shown herein without a roof panel (1). In the illustrated embodiment of FIG. 3, the system includes: a pair of side wall panels of the commode cabana (2); and a pair of mechanical stops (2A) on a rear exterior edge, of said side wall panels of the commode cabana (2). Said mechanical stops (2A) limit the extension of the urinal cabana's partition. The system illustrated in FIG. 3 also includes: a floor panel of the commode cabana (3) with tracks (3A) and hinges (10); exterior side of the rear wall panel of the commode cabana (4); a urinal (5) disposed on said exterior side of the rear wall panel of the commode cabana (4); a front wall panel of the commode cabana (6); a commode of the commode cabana (7); a waste containment chamber of the commode cabana (8); an interior side of the rear wall panel of the commode cabana (9); and hinges (10).

Figure 4:
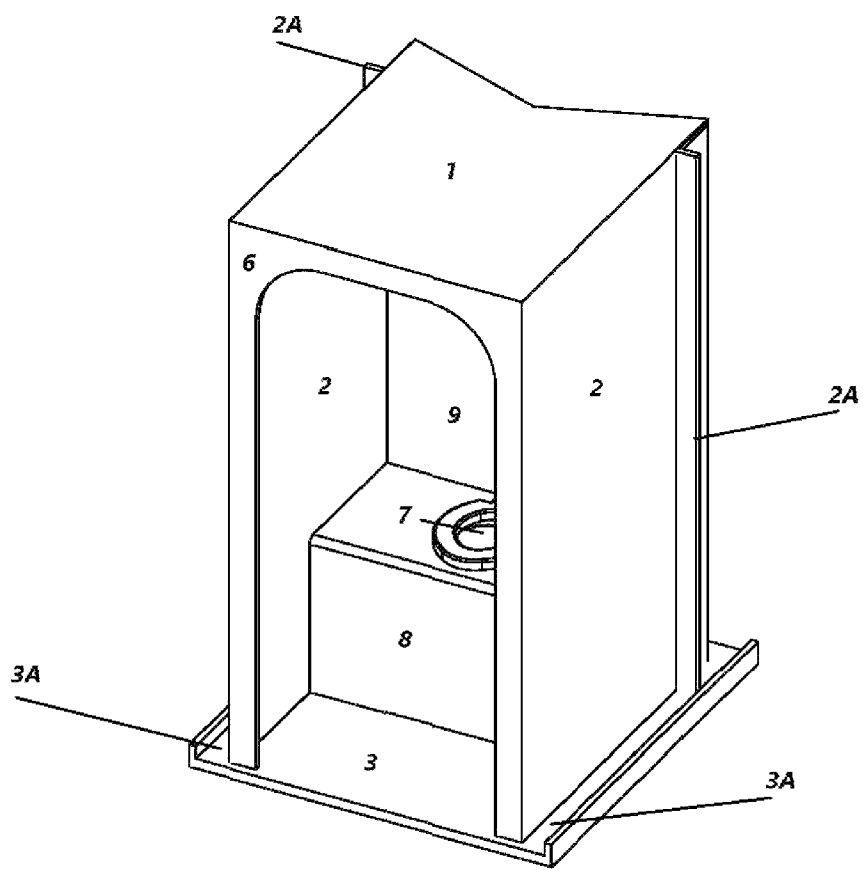
FIG. 4 is a perspective view of the modified commode cabana, according to an embodiment of the present invention, shown herein without the door.

FIG. 4 is a perspective view of the commode cabana, according to an embodiment of the present invention, shown herein without a door (15). The doors used in the system, shown in detail in FIG. 9 and FIG. 10. This embodiment includes components previously introduced in FIG. 1.

In the illustrated embodiment of FIG. 4, the system includes: a roof panel of the commode cabana (1); a pair of side wall panels of the commode cabana (2); and a pair of mechanical stops (2A) on a rear exterior edge, of said side wall panels of the commode cabana (2). Said mechanical stops (2A) limit the extension of the urinal cabana's partition. The system illustrated in FIG. 4 also includes: a floor panel of the commode cabana (3) with tracks (3A); a front wall panel of the commode cabana (6) shown without a door (15); a commode of the commode cabana (7); a waste containment chamber of the commode cabana (8); and an interior side of the rear wall panel of the commode cabana (9).

Figure 5:
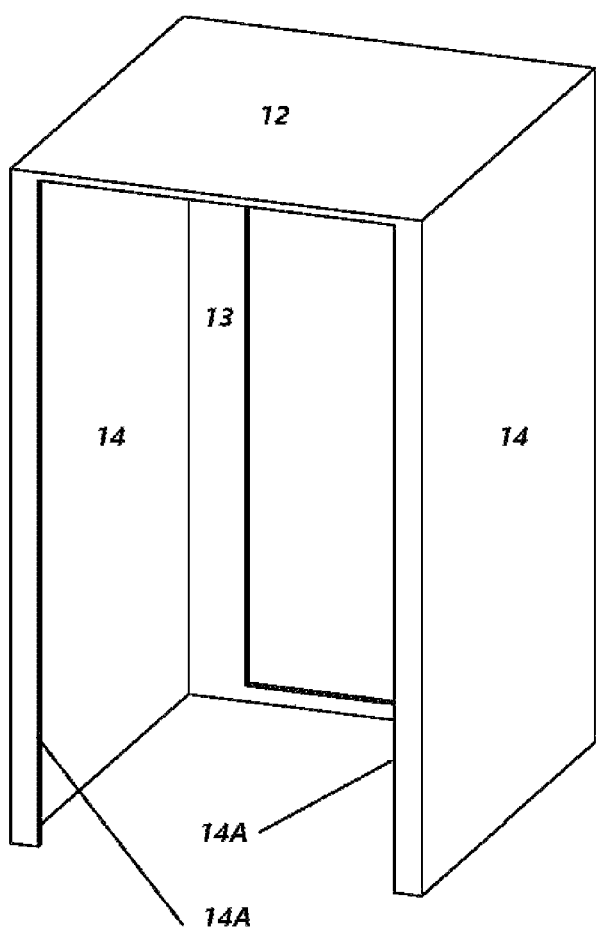
FIG. 5 is a perspective view of the sliding urinal cabana partition, according to an embodiment of the present invention, shown herein without the door.

FIG. 5 is a perspective view of the sliding urinal cabana's partition, according to an embodiment of the present invention, shown herein without a door (15). The doors used in the system, shown in detail in FIG. 9 and FIG. 10. This embodiment includes components previously introduced in FIG. 1.

In the illustrated embodiment of FIG. 5, the partition includes: a roof panel of the urinal cabana (12); a front wall panel of the urinal cabana (13); a pair of side wall panels of the urinal cabana (14); and a pair of mechanical stops (14A) on a rear interior edge, of said side wall panels of the urinal cabana (14). Said mechanical stops (14A) limit the extension of the urinal cabana's partition.

Figure 6:
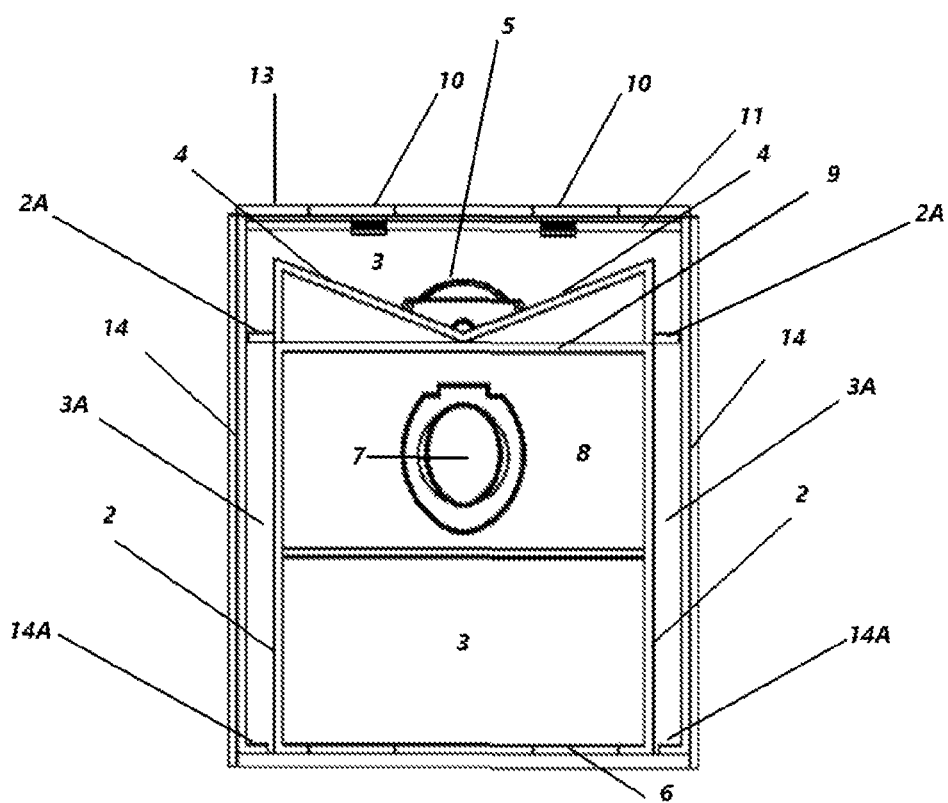
FIG. 6 is a top perspective view of the system when retracted, according to an embodiment of the present invention, shown herein without the roof panels.

FIG. 6 is a top perspective view of the system when retracted, according to an embodiment of the present invention, shown herein without the roof panel of the commode cabana (1) and without the roof panel of the urinal cabana (12). This embodiment includes components previously introduced in FIG. 1.

In the illustrated embodiment of FIG. 6, the system includes: a pair of side wall panels of the commode cabana (2); and a pair of mechanical stops (2A) on a rear exterior edge, of said side wall panels of the commode cabana (2). Said mechanical stops (2A) limit the extension of the urinal cabana's partition. The system illustrated in FIG. 6 also includes: a floor panel of the commode cabana (3) with tracks (3A); an exterior side of a rear wall panel of the commode cabana (4); a urinal (5) disposed on said exterior side of the rear wall panel of the commode cabana (4); a front wall panel of the commode cabana (6); a commode of the commode cabana (7); a waste containment chamber of the commode cabana (8); an interior side of the rear wall panel of the commode cabana (9); and hinges (10); a hinged floor panel of the urinal cabana (11); a front wall panel of the urinal cabana (13); a pair of side wall panels of the urinal cabana (14); and a pair of mechanical stops (14A) on a rear interior edge, of said side wall panels of the urinal cabana (14). Said mechanical stops (14A) limit the extension of the urinal cabana's partition.

Figure 7:
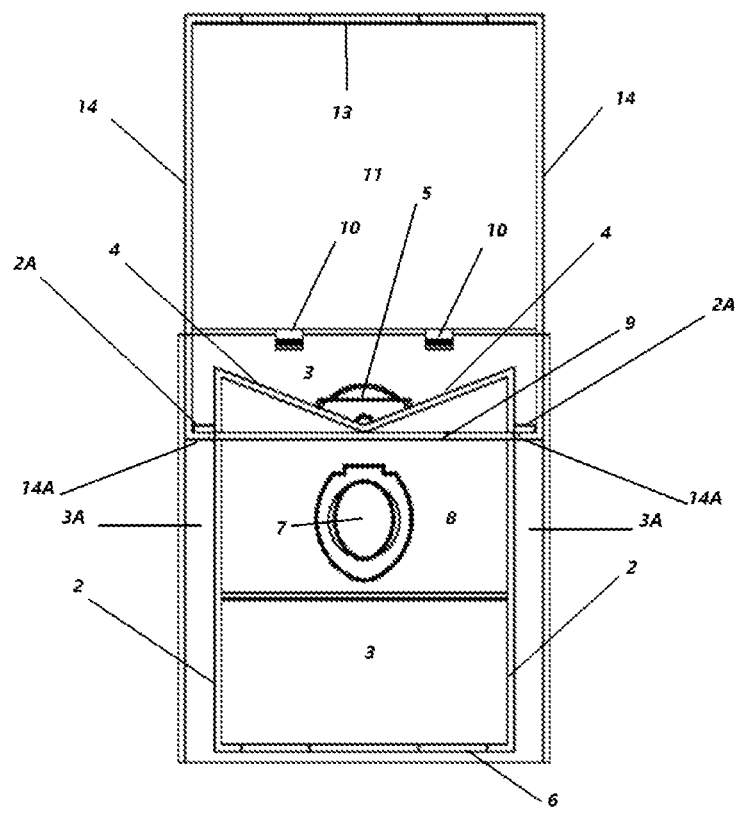
FIG. 7 is a top perspective view of the system when deployed, according to an embodiment of the present invention, shown herein without the roof panels.

FIG. 7 is a top perspective view of the system when deployed, according to an embodiment of the present invention, shown herein without the roof panel of the commode cabana (1) and without the roof panel of the urinal cabana (12). This embodiment includes components previously introduced in FIG. 1.

In the illustrated embodiment of FIG. 7, the system includes: a pair of side wall panels of the commode cabana (2); and a pair of mechanical stops (2A) on a rear exterior edge, of said side wall panels of the commode cabana (2). Said mechanical stops (2A) limit the extension of the urinal cabana's partition. The system illustrated in FIG. 7 also includes: a floor panel of the commode cabana (3) with tracks (3A); an exterior side of a rear wall panel of the commode cabana (4); a urinal (5) disposed on said exterior side of the rear wall panel of the commode cabana (4); a front wall panel of the commode cabana (6); a commode of the commode cabana (7); a waste containment chamber of the commode cabana (8); an interior side of the rear wall panel of the commode cabana (9); and hinges (10); a hinged floor panel of the urinal cabana (11); a front wall panel of the urinal cabana (13); a pair of side wall panels of the urinal cabana (14); and a pair of mechanical stops (14A) on a rear interior edge, of said side wall panels of the urinal cabana (14). Said mechanical stops (14A) limit the extension of the urinal cabana's partition.

Figure 8:
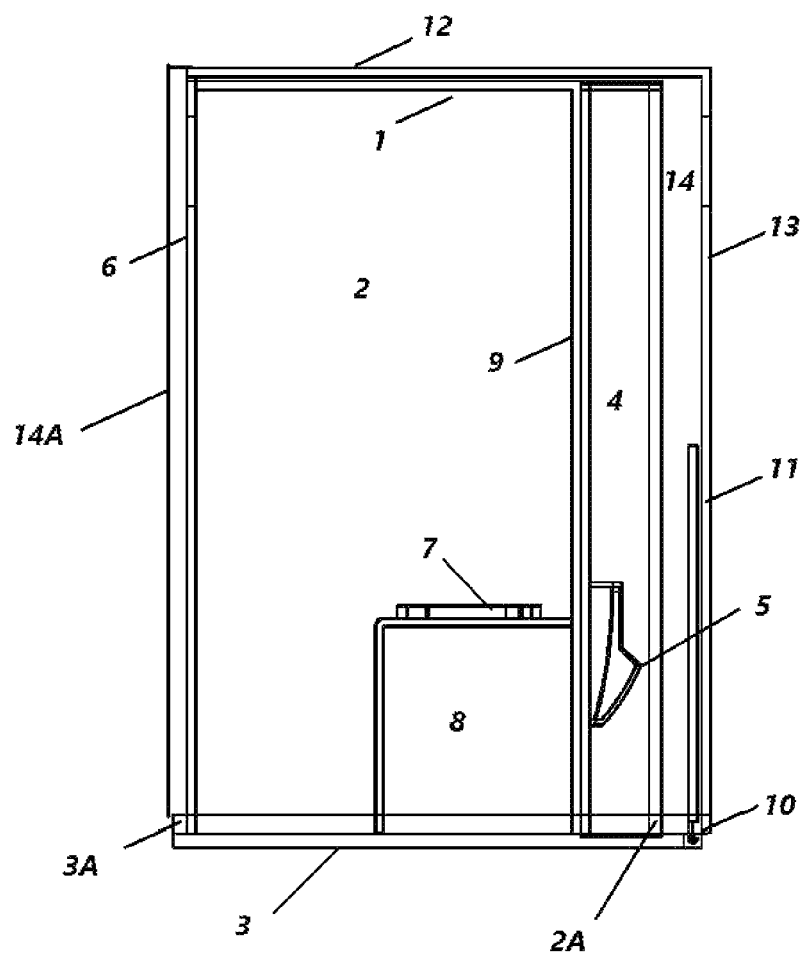
FIG. 8 is a cross-sectional view of the sliding partition enclosure system when retracted, according to an embodiment of the present invention, shown herein without either door.

FIG. 8 is a cross-sectional view of the sliding partition enclosure system when retracted, according to an embodiment of the present invention, shown herein without either door (15). The doors used in the system, shown in detail in FIG. 9 and FIG. 10. This embodiment includes components previously introduced in FIG. 1.

In the illustrated embodiment of FIG. 8, the system includes: a roof panel of the commode cabana (1); a side wall panel of the commode cabana (2); a mechanical stop (2A) on a rear exterior edge, of said side wall panel of the commode cabana (2). The system illustrated in FIG. 8 also includes: a floor panel of the commode cabana (3) with track (3A); an exterior side of a rear wall panel of the commode cabana (4); a urinal (5) disposed on said exterior side of the rear wall panel of the commode cabana (4); a front wall panel of the commode cabana (6); a commode of the commode cabana (7); a waste containment chamber of the commode cabana (8); an interior side of the rear wall panel of the commode cabana (9); and hinge (10); a hinged floor panel of the urinal cabana (11); a front wall panel of the urinal cabana (13); a side wall panel of the urinal cabana (14); and a mechanical stop (14A) on a rear interior edge, of said side wall panel of the urinal cabana (14).

Figure 9:
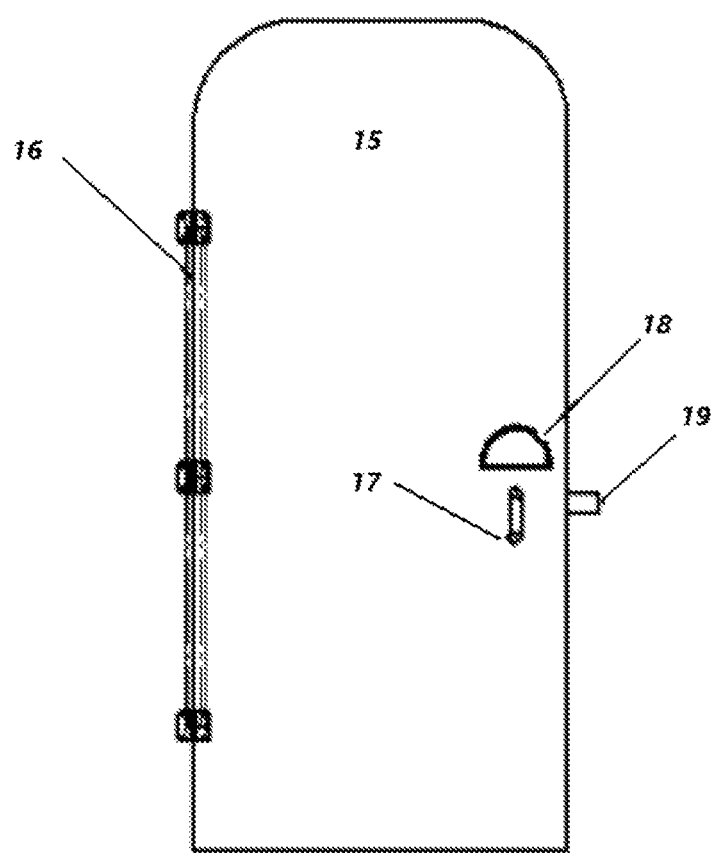
FIG. 9 is an anterior view of the front side of the door(s) with automatic closure, according to an embodiment of the present invention. Two doors are used in the system.

FIG. 9 is an anterior view of a door (15), according to an embodiment of the present invention. The system described herein uses two similar doors, one is used on a front wall panel of the commode cabana (6), and one used on a front wall panel of the urinal cabana (13).

The illustrated embodiment of FIG. 9 shows a door (15) including: hinges with automatic mechanical closure (16); exterior door handle (17); an Occupied/Vacant (locked/unlocked) sign (18); an interior door handle with latch (19). The system described herein uses two similar doors (15).

Figure 10:
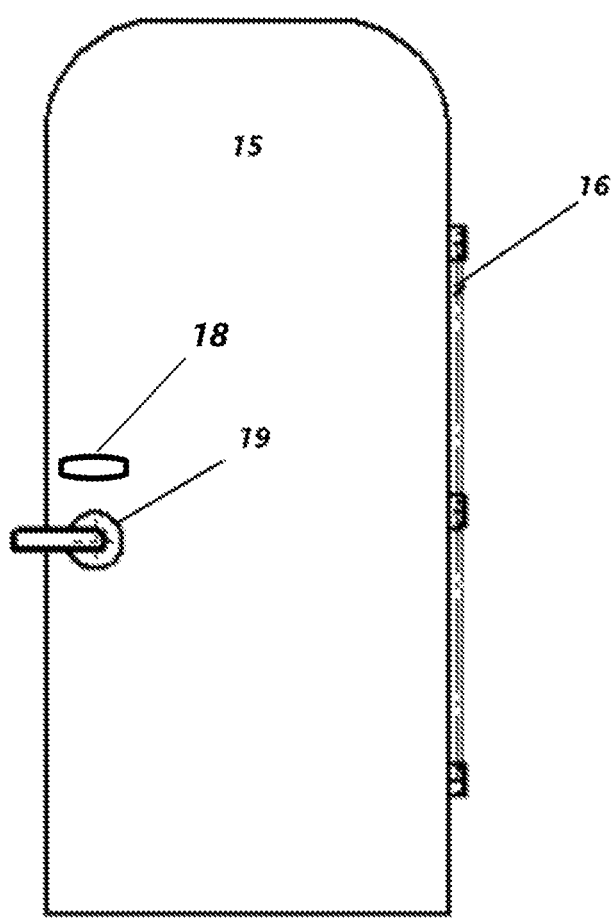
FIG. 10 is an anterior view of back side of the door(s) with automatic closure, according to an embodiment of the present invention. Two doors are used in the system.

FIG. 10 is a posterior view of a door (15) according to an embodiment of the present invention. The system described herein uses two similar doors, one is used on a front wall panel of the commode cabana (6), and one used on a front wall panel of the urinal cabana (13).

The illustrated embodiment of FIG. 10 shows a door (15) including: hinges with automatic mechanical closure (16); an Occupied/Vacant (locked/unlocked) sign (18); and an interior door handle with latch (19).

It will be apparent to one with skill in the art that the sliding partition enclosure system for a modified portable commode cabana with a private urinal cabana, of the invention may be provided using some or all the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

The invention claimed is:

1. An improved dual-person modified portable commode cabana system with a sliding partition for providing a private urinal cabana enclosure, comprising:
   a) a modified portable commode cabana enclosure including: a roof panel; a floor panel with parallel tracks hinged externally to a private urinal cabana enclosure's floor panel; a front door panel with a door and a latch; a right side panel with a mechanical stop on a rear exterior edge; a left side panel with a mechanical stop on a rear exterior edge; the right and left side panels extend from left and right sides of the front door panel to a rear panel comprising an externally mounted urinal;
   b) wherein the modified portable commode cabana comprises an internal compartment including: a commode; an optional urinal; an enclosed waste containment chamber disposed below the commode for receiving waste; a drainage system connecting the externally mounted urinal to the enclosed waste containment chamber; and the floor panel;
   c) wherein the sliding partition of the private urinal cabana includes: a roof panel; a hinged floor panel; a front door panel, with a door and latch; a right side panel with a mechanical stop on a rear interior edge; a left side panel with a mechanical stop on a rear interior edge; bottoms of the right and left side panels slide on the tracks on said floor panel of the modified portable commode cabana;
   d) wherein the system enables said sliding partition to slide along the parallel tracks of the floor panel of the modified portable commode cabana to guide the private urinal cabana enclosure from a retracted position to a functional position; the private urinal cabana's floor panel folds up parallel to the modified portable commode cabana's rear exterior, permitting the sliding partition to slide along the parallel tracks to the retracted position for transport or storage; wherein the system is deployed to the functional position by sliding the sliding partition along the parallel tracks to the stops and folding down the hinged floor for stabilizing the partition.

2. The improved dual-person modified portable commode cabana system of claim 1, wherein the sliding partition is either applied to a back of the modified portable commode cabana enclosure or applied to a left or right side of the modified portable commode cabana enclosure.

3. The improved dual-person modified portable commode cabana system of claim 1, wherein said modified portable commode cabana's left or right side panels or rear panel are configured to include a detachable external urinal.

* * * * *